United States Patent [19]

Papst

[11] 4,032,085
[45] June 28, 1977

[54] DIRIGIBLE, ESPECIALLY NON-RIGID DIRIGIBLE

[76] Inventor: Hermann E. R. Papst, Karl-Maier-Strasse 1, D-7742 St. Georgen, Schwarzwald, Germany

[22] Filed: Oct. 6, 1975

[21] Appl. No.: 620,193

Related U.S. Application Data

[63] Continuation-in-part of Ser. No. 452,675, March 19, 1974, abandoned.

[30] Foreign Application Priority Data

Mar. 21, 1973 Germany .......................... 2313919

[52] U.S. Cl. .................................. 244/30; 244/128
[51] Int. Cl.² ............................................ B64B 1/58
[58] Field of Search ............. 244/30, 24, 125, 128, 244/97

[56] References Cited

UNITED STATES PATENTS

| 988,597 | 4/1911 | Schutte ............................ 244/128 |
|---|---|---|
| 1,097,201 | 5/1914 | Upson ............................... 244/97 |
| 1,372,925 | 3/1921 | Andersson .......................... 244/30 |
| 1,700,096 | 1/1929 | Liebert et al. ...................... 244/97 |
| 2,396,494 | 3/1946 | Donnell et al. ................. 244/128 X |
| 3,079,106 | 2/1963 | Whitnah ............................ 244/30 |
| 3,180,590 | 4/1965 | Fitzpatrick ......................... 244/30 |
| 3,456,903 | 7/1969 | Papst .................................. 244/30 |

Primary Examiner—Trygve M. Blix
Assistant Examiner—Barry L. Kelmachter
Attorney, Agent, or Firm—Cushman, Darby & Cushman

[57] ABSTRACT

The present invention relates to a dirigible, especially a non-rigid dirigible, wherein the body of the dirigible has at its bow section and at its stern section cells pressurized under a higher pressure than the maximum dynamic pressure produced at the bow under flight conditions, whereby the body of said dirigible in the region of the pressure transition circular lines is subdivided by partitions forming said cells, which partitions are adapted to receive pressure without any substantial deformation.

12 Claims, 5 Drawing Figures

DIRIGIBLE, ESPECIALLY NON-RIGID DIRIGIBLE

This is a continuation-in-part of application Ser. No. 452,675 filed Mar. 9, 1974 now abandoned.

The present invention relates to a dirigible, especially a non-rigid dirigible.

Conventional non-rigid dirigibles must be operated under an overpressure because of the dynamic pressure produced at the bow under flight conditions. This compression of the lifting or buoyant gas results in a reduction of the buoyancy per unit of volume. Likewise, this results in higher loads applied to the walls of the envelope, whereby the weight of such envelope, and also the expenses for the complete envelope, increase correspondingly.

The present invention has as its object to eliminate these drawbacks, and to provide, in an advantageous manner, a pressure relief of the lifting gas compartments. An important object resides in the provision of a construction of a dirigible with which higher speeds of travel can be obtained while, nevertheless, at the same time reducing the total weight of the non-rigid envelope of the dirigible.

Hereby, the construction of the envelope of the dirigible should be simplified and rendered less expensive, too.

Finally, it should also be ensured by simple means that a non-rigid dirigible comprising a flexible non-rigid envelope maintains its aerodynamically optimum configuration even at elevated temperatures.

Another object resides in the provision of a compartment interiorly of the dirigible, which compartment, while being connected to a device for generating hot (water) steam, allows to uniformly and efficiently supply heat to the lifting gas of the dirigible, without requiring to mix the remainder of the lifting gas with the steam. At the same time, the compartment according to the invention should provide for a pressure balance or compensation for the lifting gas at various altitudes of flight.

According to the invention, this is obtained in that the body of the dirigible has at its bow section and at its stern section cells pressurized under a higher pressure than the maximum dynamic pressure produced at the bow under flight conditions, whereby the body of said dirigible in the region of the pressure transition circular lines is subdivided by partitions forming said cells, which partitions are adapted to receive pressure without any substantial deformation.

This region of the pressure variation or pressure transition circular lines is the transition area between the dynamic pressure zone at the bow or at the stern which is formed during the fast travel of the dirigible through the air, and a suction or reduced pressure zone in the center portion of the dirigible or lifting gas body, as explained in detail in FIG. 1. The line where the exterior pressure exerted by the motion reverses its polarity (positive to negative), in a body of rotation as formed by a dirigible is a circle having a diameter of approximately 0.6 times the maximum outer diameter of the body of the dirigible. In this way, the compartment or space containing the lifting gas experiences a substantial pressure relief.

The dynamic pressure produced both at the bow and at the stern is taken up by this cell or these cells in the construction according to the invention, such that particularly the major portion of the walls of the lifting gas space need no longer be dimensioned for the high dynamic pressure existing at the front end of the bow. The maximum suction pressure at the mid or center portion of the lifting gas body amounts to about one-third of the maximum dynamic pressure.

In an embodiment of the invention, it is proposed that the abovementioned partitions comprise plate-shaped, especially hollow walls having an internal frame of highly inflated, tube-shaped, annular bodies in connection with elements adapted to be loaded in tension. This provides the desired radial inherent stiffness of the partitions which, in the case of a highly inflated annular member, does not affect the full collapsibility of the liftings gas body when the dirigible is taken out of operation.

Another substantial advantage is provided by an embodiment of the invention wherein the pressure existing in the cell positioned at the bow is generated by dynamic pressure, whereby the interior space of said cell is connected to the exterior side preferably at the front end of the bow.

In order to provide an additional reinforcing of the entire dirigible construction, the partitions provided in the bow and in the stern sections may be interconnected to the keel frame.

With the provision of separate compartments in the front end of the bow section, it is also possible that said cell is subdivided into a pair of gas compartments by a movable (gas) tight wall, whereby one of said gas compartments acts as a compensation container or reservoir for a protective gas within the envelope of said dirigible which is formed as a double wall.

As a consequence of the subdivision of the body of the dirigible by means of the partitions provided in the bow and stern sections where axial and radial inherent stiffness for taking up the pressure forces acting externally on the bow and stern sections is of importance, it is simultaneously rendered possible to produce envelopes of this kind from a plurality of annular members each having its own inherent stiffness, by joining these members from the outside thereof. In particular, in non-rigid dirigibles the use of inflatable double walls having sufficient inherent stiffness at a corresponding test pressure, is of substantial advantage because in such case a hanger is not absolutely necessary.

The arrangement according to the invention is of particular advantage for a rear-engine drive including air jet nozzles since a high fan or compressor pressure can be used. In the bow section which is subjected to a higher dynamic pressure, compensating containers or reservoirs for the protective gas of a non-rigid dirigible operated with heat insulation having an annular construction may be provided. The aerodynamic configuration is not affected thereby.

The lifting gas body or the envelope wall according to the invention are subdivided by special partitions preferably near the circular lines of the pressure transition, whereby these partitions are formed stiff in radial direction and, advantageously, also in the axial direction such that the outline of the lifting gas envelope is not distorted. The partitions are constructed such that they receive or take up the dynamic pressures directed against the center of the body of the dirigible at least to a degree corresponding to the sum of the areas of the respective horizontal components, and transmit these pressures to the outer wall of the envelope, as far as the sum of the areas of the lifting gas pressures is not already sufficient to this end. According to the so-called Fuhramann's curve, the average value of the horizontal components of the pressure applied to the bow surface (area) within the transition circle diameter amounts to 0.24, i.e. to about one-fourth of the peak pressure exerted upon the center of the bow, whereby the pressure transition circular line has a diameter of about 0.6 times the maximum outer diameter. Thus, the bow wall adjacent the lifting gases may be supported by the lifting gases by means of a slightly higher pressure. The supporting pressure is combined by the gas buoyancy and a possibly necessary static pressure. For the buoyancy pressure which increases towards the apex of the envelope, there applies its average value which is effective at one half of the height thereof.

It may be advantageous to connect the bow partition including its non-resilient edge portion which may consist of a hollow ring or annulus or a lattice frame, to the keel frame through non-resilient, i.e. rigid supports consisting of pipes or lattice grids. In this way, it is possible to dispense with the static counter-pressure (reaction pressure) in the lifting gas, because this shortage can be compensated for by the stiff rings from the bow or stern walls to the keel frame between bow and stern walls.

In connection herewith and further in accordance with the invention, the bow or stern wall is formed by a hollow, plate-shaped lattice or grid frame wall, preferably provided with a close covering.

Alternatively or additionally, in accordance with another embodiment of the invention the wall may be formed by a highly inflated, little resilient or elastic ring and a spherical cup-shaped element adapted to be loaded by tension forces.

Also, the horizontal suction components on the curved lifting gas body portion beyond the transition circle between the pressure and suction areas are effective. In a non-rigid dirigible having double-wall rings inflated with a protective gas, these rings are readily capable of transmitting the thrust in their widthwise direction to the partition in the bow and stern sections.

The pressure division can be readily made use of, because the suction resulting from the flow of air over the center portion which contains the lifting gas, is of substantial magnitude and at certain places may reach a value of up to 40% of the maximum dynamic pressure. However, it is hereby favorable that the diameters these points are smaller than the maximum diameter of the center portion which is subjected to a lesser reduced pressure.

A further advantageous embodiment of the invention contemplates that the bow and stern cells are formed by approximately spherical walls whereby the bow and stern cells, respectively, may be subdivided, by a movable (gas) tight wall into a pair of gas compartments with one of said compartments being under a blowing pressure due to the dynamic pressure generated under flight conditions or under a fan or compressor pressure, such that the movable wall along with the interior spherical wall compresses an otherwise required gas and can be expanded and contracted under pressure.

These so-called bow and stern transition walls, respectively, are interconnected with the keel bridging frame in a further embodiment of the invention.

According to the invention, it is further contemplated that the bow compartment which is independent of the lifting gas, under flight conditions can be automatically filled with air from the direction of travel up to the dynamic pressure, whereby a safety valve vents the air during descent. Further, according to the invention it is contemplated to construct in the subdivision of a lifting gas body a highly inflated annular body for receiving axial loads or forces in such a manner that at least the annular area on the side of the lower pressure takes torsional forces on the annular body by radial tension forces by means of a tensioned gas-tight wall or at least by diagonal chords.

A substantial further development of the dirigible according to the invention consists in that approximately in the region of the center of gravity of the buoyant forces of the lifting or buoyant gas there is provided a device by means of which the interior space of said lifting gas body is subdivided into at least two compartments and which includes a center wall structure having an annularly reinforcing frame as well as gas-tight, closed, diaphragm-shaped walls adapted to be exvaginated in longitudinal direction, with a compartment being defined between said walls which compartment communicates with a device for supplying hot or heated (water) steam into said compartment.

In addition to the dual function of this constructive element as a device for heating the lifting gases and as a pressure balance or compensation cell, the supply of (water) steam as the heating gas can thereby be limited to a separate compartment, such that the additional water ballast is substantially reduced by wetting the entire interior space of the dirigible.

In the following, the present invention is described in greater detail in connection with several exemplary embodiments and further developments by referring to the enclosed drawings, wherein.

Figure 1:
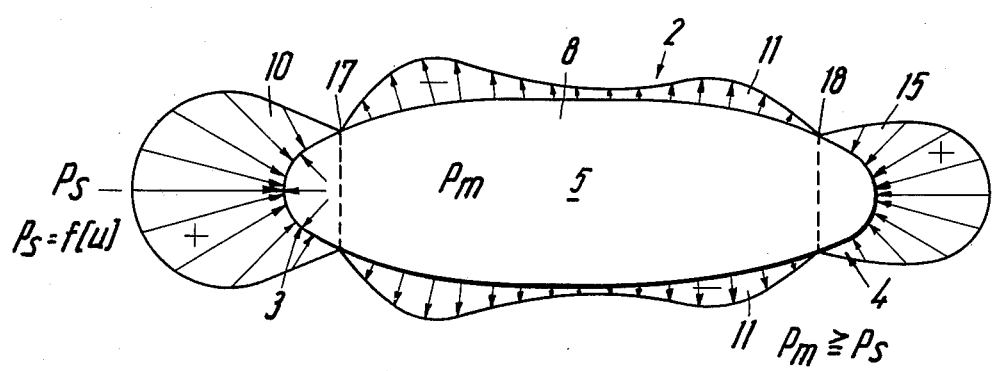
FIGS. 1 and 2 are schematical views showing the pressure and suction or reduced pressure zones in a non-rigid dirigible or airship showing a combination of features according to the invention.

FIG. 1 illustrates a lifting gas body or bag 2 for a non-rigid dirigible or airship 1, which gas body includes a continuous interior space 5 extending from the bow 3 to the stern 4. The non-rigid envelope 6, on the one hand, may be of double-wall construction with tie-up elements extending between said walls, whereby the intermediate space between said double walls (as shown e.g. in FIGS. 4 and 5) is subjected to the pressure of a gas which provides to the gas body 2 its required inherent stability and whereby the interior space 5 within the gas body 2 is formed. On the other hand, the inherent stability of the lifting gas body 2 can be provided even in the case of a non-rigid envelope 6 comprising a single wall only, if the interior space 5 of the lifting gas body 2 is under a correspondingly high pressure of a gas having a high buoyancy or lift effect (such as e.g. hydrogen).

Figure 2:
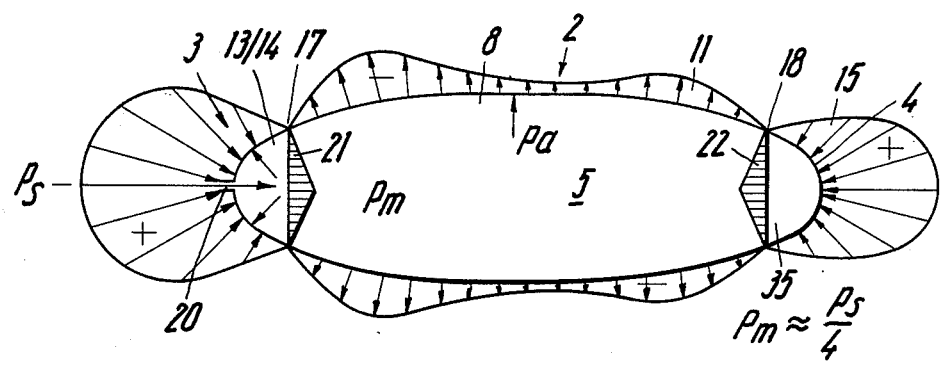

In the travel of a lifting gas body according to FIGS. 1 and 2, there are produced on its surface, on the one hand, pressure zones, i.e. the pressure zone 10 on the bow 3 of the body 2 and the pressure zone 15 on the stern 4 of said body 2, and, on the other hand, an extensive suction zone 11 around the center portion 8 of said gas body 2. In FIG. 1, the transition between the pressure zone 10 on the bow 3 and the suction zone 11 is illustrated as a pressure variation circular line 17, and the transition from the suction zone 11 to the pressure zone 15 is shown as a pressure variation circular line 18.

The pressure transition circular lines 17, 18 have a diameter of approximately 0.6 times the maximum outer diameter of the center portion 8 of said gas body 2. The complete pressure distribution curve on the surface of the lifting gas body 2 is determined by the maximum dynamic pressure $p_s$ at the respective given speed of the travelling non-rigid dirigible 1 or of a corresponding aircraft. The lifting gas body 2 the strength of which is determined similarly as the configuration of a (boiler) vessel, due to the influence of the dynamic pressure on the entire surface of the body 2 over the full extension of its non-rigid envelope 6 must be dimensioned or constructed to take up the stresses which the dynamic pressure exerts not only at the bow 3, but also at the stern 4 onto the lifting gas body 2. In the center portion 8 of the gas body 2, i.e. in the suction zone 11, there is present a tensile load because of the flow around the curved surface of the body 2. This load acts in the same direction as the internal pressure $p_m$ of the non-rigid envelope 6, and this load is added to the stress exerted by the dynamic pressure $p_s$. In order that the bow 3 is not deformed during the movement of the body 2 through the air, the non-rigid envelope 6, thus, must be constructed or dimensioned to bear a higher pressure than that imposed by the dynamic pressure $p_s$ alone.

As shown in FIG. 2, in the regions of the pressure variation circular lines 17, 18 there are provided schematically illustrated partitions 21, 22 within the interior space 5, which partitions may consist, for example, of a grid-type honeycomb structure having plates adhesively connected to both faces thereof.

At the places where the partitions 21, 22 are connected to the non-rigid envelope 6, i.e. in the region of the pressure variation circular lines 17, 18, the portions of the bow 3 and of the stern 4 are separated from the mid portion 8 of the lifting gas body 2. As illustrated in the example according to FIG. 4, a keel cockpit 7 is mounted underneath the lifting gas body 2 by means of suspension bands 9, which keel cockpit defines the engine, operation, passenger and freight compartments and which compartments over the major portion of the length of the gas body 2 are connected to the latter. As mentioned above, the pressure existing within the interior space 5 of the mid portion 8 of the lifting gas body 2 need not exceed about one-fourth of the maximum dynamic pressure $p_s$. Normally, such pressure is already obtained by the uplift pressure alone.

In view of the fact that dirigibles (compare e.g. FIG. 5) should be safely operable even in sloping positions or attitudes up to about 30°, the maximum inner pressure in the upper portion of the mid portion 8 of said lifting gas body 2 will be dimensioned for a lift gas pressure of about 1.8 × d. This applies e.g. if the lifting gas body 2 is filled with hydrogen to full capacity. If the interior space 5 is only partially filled with hydrogen or filled exclusively with natural gas, steam or mixtures thereof, a pressure is sufficient the magnitude of which corresponds to about 1.1 × d.

Figure 3:
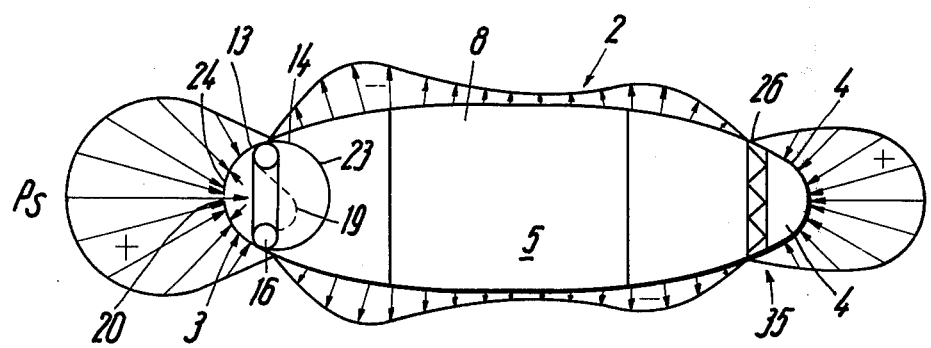
FIGS. 3 and 4 show two specific embodiments of the present invention, illustrated in a schematical sectional view of the non-rigid dirigible.

In the embodiment of the construction according to the invention as shown in FIG. 3, the portion at the bow 3 is formed as an approximately spherical space separated from said lifting gas body 2 and being sealed with respect to the gas compartment 5. The connection of this portion formed by this spherical space 13, 14 to the remainder of the envelope 2 is constructed to incorporate an annular body 16 inflated with a higher internal pressure, whereby the attachment is effected at the common tangent areas of the annular body 16 and of the fabric-reinforced walls of the spherical space 13, 14. The wall of this spherical space 13, 14 directed from this connection towards the interior space 5 is designated with 23, while the wall directed towards the bow 3 is designated with 24. The annular body 16 may have secured thereto a bag-shaped, exvaginating intermediate wall or partition 19 which subdivides the spherical space into a front compartment 13 and into a rear compartment 14. As the outer wall 24 is provided with an aperture 20, the interior of the front compartment 13 is subjected to a pressure the value of which corresponds to the maximum dynamic pressure at the point or front end of the bow 3. The rear compartment 14 of the spherical space 13, 14 may serve to receive, preferably, a protective gas which fills out the gap between the double walls when the non-rigid envelope 6 is formed as a double-wall construction.

Figure 4:
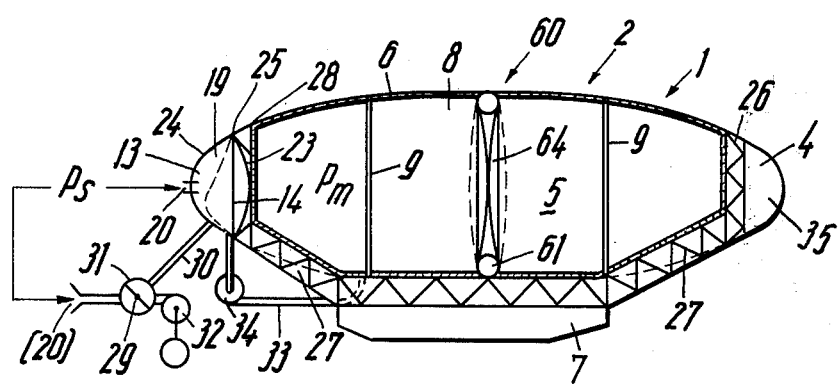

In the further development of the invention as shown in FIG. 4, in the region of the pressure transition circular lines 17, 18 (compare FIGS. 1 and 2) there is provided instead of the annular body 16, a rigid frame ring 25 at the bow 3 and a similar frame ring 26 at the stern 4 (compare also FIG. 5), which frame rings are rigidly connected to the rigid keel cockpit 12 through a frame construction. As shown in FIG. 4, the rear compartment 14 which is defined between the partition 19 and a wall 28 directed towards the center portion 8, communicates with the gap within the double walls of the non-rigid envelope 6 through a fan 29 (conduit 30), while the front compartment 13 is pressurized by the dynamic pressure applied through the aperture 20 which is further pointed out in FIG. 2 (compare the arrows extending to $p_s$). Further, the above-described pressure system includes additional means 31, 32 to produce a pressure which may exceed the maximum dynamic pressure $p_s$ at the bow 3. The connection between the rear compartment 14 and the gap defined by a double-wall non-rigid envelope 6 is diagrammatically shown at 33 in FIG. 4, whereby an auxiliary fan 34 may be interposed. By means of this combination 14, 33, 34, the inflating pressure of the center portion 8 of the lifting gas body 2 is produced, so that the inherent stability of this body is ensured. During travel of the non-rigid dirigible 1 at constant altitude, the fans 29 and 34 may be inactivated. The rigid frame ring 26 shown in FIG. 4 and connected to the frame construction 27, and which, as shown in FIG. 3, may be provided independently of the frame construction 27, too, is constructed as a lattice grid frame which reinforces the envelope of the gas body 2 in the region of the pressure transition circular line 18 and renders the pressure existing in the stern compartment 35 to be independent from the pressure of the lifting gas present in the interior space 5. In addition to the structural principles shown above, in the embodiment according to FIG. 5 a rear-engine driving means in the form of a jet nozzle 51 is provided which because of the partition 22 provided in the region of the circular line 18 or because of the rigid frame ring 26, optionally with interconnection through the frame construction 27, may operate with an air jet thrust which may be selected absolutely independently of the pressure existing within the non-rigid envelope 6. Hereby, the pressure exerted by the air jet thrust may substantially exceed the maximum dynamic pressure $p_s$, whereby the air jet flows out from the nozzle at a velocity exceeding the forward speed of the dirigible 1. In this way, a favorable value of the quantity of the lifting gas per unit of volume within the body of the dirigible can be obtained. The air jet nozzle 51 may consist within a reinforcing frame 52 of an outer nozzle shroud 53 and an inner nozzle cone 55 disposed within said shroud and adapted to be moved radially and axially by control means 54, whereby the jet medium or fluid (e.g. air) is produced within the keel cockpit 7 and passed to the nozzle 51 through not illustrated conduits and expelled by said nozzle via an annular nozzle orifice 56. The frame construction 27 disposed between the rigid frame rings 25 (at the bow 3) and 26 (at the stern 4) and extending continuously above the cockpit 7 compensates for a lack of lifting gas pressure in the lower portion of the lifting gas body.

Figure 5:
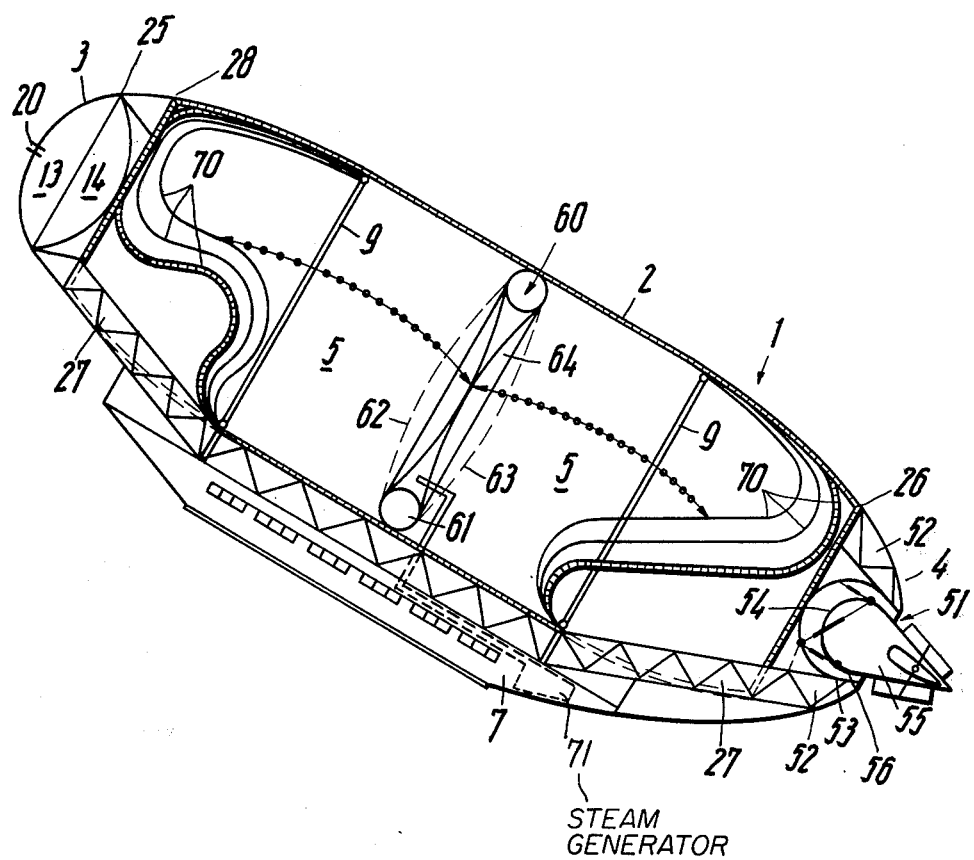
FIG. 5 is a schematical sectional view of another embodiment of the non-rigid dirigible according to the invention.

As shown in FIGS. 4 and 5, the interior space 5 of the lifting gas body 2 is also subdivided by means of a center wall construction which comprises essentially a frame 61 which annularly reinforces the envelope 6 in the center portion 8 from the inner side thereof, as well as exvaginating, gas tight walls 62, 63 secured to said frame 61. Hereby, the frame 61 which may consist either of an annular body corresponding to the annular body 16 or of a rigid frame ring corresponding approximately to the frame ring 26, is connected in gas-tight fashion to the inner face of the envelope 6. The gastight walls 62, 63 due to their gas-tight connection to the frame 61 form between them a compartment 64 which, in a manner not shown in greater detail, is connected to a device 71, preferably provided within the keel cockpit 7, for the production of (water) steam. Due to the continuous introduction of fresh steam into the compartment 64, the gas-tight walls 62, 63 constitute a heating device which is adapted to constantly maintain the lifting gas within the interior space 5 at a controlled temperature. However, the compartment 64 may also be kept filled with another lifting or buoyant gas, e.g. hydrogen, but especially a mixture of hydrogen and steam, whereby such gas mixture allows to maintain the boiling point of the water within the compartment 64 in accordance with Dalton's theory, in correspondence with the (lower) partial pressure of the steam as compared with the remainder of the gas. To this end, there are only required a predetermined, metered quantity of water and a heat supply controlled in such a manner that the continuously back flowing steam condensate is just vaporized again. In the not illustrated device for the vaporization and for the continuous supply of steam into the compartment 64, according to the invention a control means may be provided which, for example, comprises a contact scales which continuously measures the returning condensed water and which initiates a corresponding heat supply. As long as condensed water being present acts upon the contact scales with its weight, heat is then supplied, e.g by passing through a heating element which is heated by the excess heat of the engine.

A further modified embodiment may comprise a simple downcomer (pipe) wherein the water condensate is collected and which, e.g. by a U-shaped pipe, communicates with means for the constant re-vaporization of the water. To this end, it is only necessary that the bottom of a container or reservoir which communicates with the downcomer is provided with heating ribs or fins. This results in a very easy automatic control of the temperature within the compartment 64 which, besides, is formed to be adapted to resiliently exvaginate into the interior space 5 in such a manner that variations of the lifting gas volume at different altitudes (pressure differences between ground and fight conditions at high altitudes) are compensated for. The word exvaginate means that the walls of the compartment 64 can extend into the interior space 5, as shown in dotted lines in FIG. 3, the pressure in the compartment 64 is higher than the pressure in the space 5. Hereby, the gas-tight walls may both bulge out into the interior space 5 and (as shown by the solid lines in FIGS. 4 and 5) move relative to each other such that a compensation volume of a corresponding size is formed. The provision of the center wall construction 60 including the compartment 64 provides for a uniform heating action on both sides of the interior space 5, such that the flight stability of the non-rigid dirigible 1 is ensured, too.

The additional intermediate walls or partitions shown in FIG. 5 and which are likewise adapted to be resiliently exvaginated, on the one hand an auxiliary pressure compensating function and, on the other hand and mainly, permit the interior space 5 to be separately filled with different types of gases. However, the flexibe walls or partitions 70 are independent of the function of compartment 64 (compare FIG. 4).

The above-described assembly 60 to 64 according to the invention for the simultaneous heating of a volume of gas and for the compensation of the buoyancy within a dirigible is not limited to a dirigible or airship only wherein lifting gas consisting of natural gas is consumed from the lifting gas volume and, for the compensation of the lift or buoyancy, replaced by recirculated steam. Likewise, this assembly may be used also in dirigibles which use up natural gas from the lifting gas volume to such a degree that the weight of consumed liquid aircraft fuel is compensated for. However, this assembly can be successfully employed also in dirigibles or airships which operate in accordance with different systems.

In addition to the above-described system of the central subdivision of the interior space 5, approximately in the mid position of the interior space 5 there may be provided a disc or layer of heated gas to which the necessary heat is supplied by means of steam. Hereby, the quantity of gas in the layer arrangement and the steam supplied or the quantity of vaporized water existing in the circuit, respectively, can be mutually correlated in such a manner that the desired temperature of the boiling or condensing point is obtained which temperature, e.g. in case of a ratio of 50% of hydrogen (or another gas) and 50% of steam, is at 81° C. According to Dalton's theory, a gas in a mixture with another gas behaves as if it were present alone. The resulting reduction of the boiling point in the present example corresponds to the boiling point of water at an altitude of 5,000 meters.

However, any other desired temperature may be adjusted, too, such as a temperature of 50° C. The dependency of moisture saturated air at a temperature of 50° C (e.g. tropical temperatures) corresponds to a water proportion of 93 grams of water per cubic meter. In order to still further reduce the heat loss of a heated lifting gas through the heat-insulating non-rigid envelope, as low as possible an operational temperature of the lifting gas must be obtained, whereby, in particular, the portion of the heat loss induced by radiation is greatly reduced.

What I claim is:

1. A non-rigid dirigible comprising:
   a non-rigid inflatable body member having a bow section and a stern section;
   partition means secured to the body member so as to define gas cells in each section which can be pressurized to a higher pressure than the maximum dynamic pressure produced at the bow and the stern sections under flight conditions, the exterior of the body member being inherently subjected under flight conditions to a pressure zone at the bow and the stern portions and to a suction zone intermediate the pressure zones with a pressure transition zone between each pressure zone and the suction zone, the partition means being disposed at each pressure transition zone, at least one of the partition means further comprising an annular tubular ring member engaging the inner wall of the body member and bulkhead means adapted to be loaded by tension and in engagement with the ring member.

2. A non-rigid dirigible as defined in claim 1 wherein the bulkhead means comprises a single wall secured to the ring member.

3. A non-rigid dirigible as defined in claim 1, including means communicating the interior space of the cell in the bow section with the exterior of the body member so as to pressurize the cell in the bow section during flight.

4. A non-rigid dirigible as defined in claim 1 wherein the ring member is non-rigid, inflatable and sealingly engages the inner wall of the body member when inflated.

5. A non-rigid dirigible as defined in claim 1 wherein at least one of the partition means is secured to a keel cockpit under the body member.

6. A non-rigid dirigible as defined in claim 1 wherein at least one of the cells formed in the bow and stern sections is further divided into two compartments by a wall member, whereby one of the compartments acts as a compensation container for a protective gas within an envelop formed by a double wall of the body member.

7. A non-rigid dirigible as defined in claim 1, including wall means dividing the interior space of the body member into at least two compartments, the wall means comprising at least one wall structure having an annular tubular reinforcing ring member and gas-tight, closed, diaphragm-shaped walls adapted to be exvaginated into a longitudinal direction, the walls defining between them a further compartment which communicates with a device for supplying steam into the further compartment.

8. A non-rigid dirigible comprising: a non-rigid inflatable body member having a bow section and a stern section; partition means secured to the body member so as to define gas cells in each section which can be pressurized to a higher pressure than the maximum dynamic pressure produced at the bow and the stern sections under flight conditions, said partition means further defining a mid portion in said body member between said bow and stern sections which can be pressurized to a lower pressure than said cells, the exterior of the body member being inherently subjected under flight conditions to a pressure zone at the bow and the stern portions and to a suction zone intermediate the pressure zones with a pressure transition zone between each pressure zone and the suction zone, the partition means being disposed at each pressure transition zone, at least one of the partition means further comprising rigid frame member engaging the inner wall of the body member and flexible bulkhead means adapted to be loaded by tension and in engagement with the frame member, and wall means dividing the interior space of the body member into at least two compartments, the wall means comprising at least one wall structure having an annular tubular reinforcing ring member and gas-tight, closed, diaphragm-shaped walls adapted to be exvaginated in a longitudinal direction, the walls defining between them a further compartment which commmunicates with a device for supplying steam into the further compartment.

9. A non-rigid dirigible as defined in claim 8 wherein the bulkhead means comprises a single wall secured to the frame member.

10. A non-rigid dirigible as defined in claim 8, including means communicating the interior space of the cell in the bow section with the exterior of the body member so as to pressurize the cell in the bow section during flight.

11. A non-rigid dirigible as defined in claim 8 wherein at least one of the partition means is secured to a keel cockpit under the body member.

12. A non-rigid dirigible as defined in claim 8 wherein at least one of the cells formed in the bow and stern sections is further divided into two compartments by a wall member, whereby one of the compartments acts as a compensation container for a protective gas within an envelope formed by a double wall of the body member.

* * * * *

UNITED STATES PATENT OFFICE
CERTIFICATE OF CORRECTION

Patent No. 4,032,085             Dated June 28, 1977

Inventor(s) Hermann E. R. Papst

It is certified that error appears in the above-identified patent and that said Letters Patent are hereby corrected as shown below:

Column 3, line 46, after "diameters" insert --at--.

Column 4, line 6, after "takes" insert --up--.

Signed and Sealed this

Sixth Day of December 1977

[SEAL]

Attest:

RUTH C. MASON           LUTRELLE F. PARKER
Attesting Officer       Acting Commissioner of Patents and Trademarks